United States Patent [19]

Kida et al.

[11] Patent Number: 5,226,639
[45] Date of Patent: Jul. 13, 1993

[54] PAPER FEEDING DEVICE FOR FACSIMILE APPARATUS

[75] Inventors: Shigeru Kida; Motohiko Hayashi, both of Yamato-Koriyama; Ryoichi Kawai, Kita-Katsuragi, all of Japan

[73] Assignee: Sharp Kabushiki Kaisha, Osaka, Japan

[21] Appl. No.: 859,586

[22] Filed: Mar. 27, 1992

[30] Foreign Application Priority Data

Mar. 29, 1991 [JP] Japan .................................. 2-66916

[51] Int. Cl.$^5$ .............................................. B65H 3/44
[52] U.S. Cl. ..................................... 271/9; 271/109; 271/264
[58] Field of Search ............................ 271/9, 109, 264

[56] References Cited

U.S. PATENT DOCUMENTS

| | | | |
|---|---|---|---|
| 4,691,911 | 9/1987 | Nakagawa | 271/9 |
| 4,866,531 | 9/1989 | Kobori et al. | |
| 5,141,346 | 8/1992 | Nakagawa | 271/9 X |

FOREIGN PATENT DOCUMENTS 54-57818  5/1979 Japan .
61-184248 8/1986 Japan .
63-155862 6/1988 Japan .

Primary Examiner—Richard A. Schacher
Attorney, Agent, or Firm—David G. Conlin; Robert F. O'Connell

[57] ABSTRACT

The paper feeding device comprises a drive source having a shaft rotatable in forward or reverse direction and a drive gear mounted fixedly to the shaft, a sun gear engaging with the drive gear and being rotatable around a supporting point, first and second planetary arms mounted rotatably to the supporting point of the sun gear, respectively, first and second planetary gears engaging with the sun gear and attached rotatably to the first and second planetary arms, respectively, and arm lock mechanism for positioning and fixing the first and second planetary arms, respectively. The rotation of the shaft of the drive source is transmitted through the first planetary gear to an original feeding roller in the transmission mode and to a platen roller in the reception mode. The driving force is transmitted to the original feeding roller via the second planetary gear and to the platen roller via the first planetary gear in the copy mode.

5 Claims, 8 Drawing Sheets

PAPER FEEDING DEVICE FOR FACSIMILE APPARATUS

BACKGROUND OF THE INVENTION

1. Field of the Invention

The present invention relates to a paper feeding device, used for a facsimile apparatus, for an original and a recording paper.

2. Description of the Related Art

A conventional facsimile apparatus is provided with a paper feeding mechanism, in which mechanism an original is fed into the facsimile apparatus by rotation of an original feeding roller and the original is read. A recording paper is also fed by rotation of a platen roller.

The inventor of the present invention knows the paper feeding mechanism including both a motor 52 for rotating an original feeding roller 51 and a motor 54 for rotating a platen roller 53 as shown in FIG. 1. In this type of paper feeding mechanism, during transmission in which an original is fed, the motor 52 for transmission is driven to rotate the original feeding roller 51, and during reception in which a recording paper is fed, the motor 54 for reception is driven to rotate the platen roller 53.

During copying in which both an original and a recording paper are fed simultaneously, the motor 52 and the motor 54 are driven simultaneously so that the original feeding roller 51 and the platen roller 53 are rotated simultaneously. When this paper feeding mechanism is applied to a facsimile apparatus with an auto cutter, for example, during a reverse rotation of a receiving system in which a recording paper is brought from a position of an auto cutter back to a printing position, the motor 54 is driven in reverse direction to cause the platen roller 53 to make the reverse rotation.

The inventor knows another type of paper feeding mechanism which is provided with three one-way clutches 61, 62, and 63, by means of which an original feeding roller 65 and a platen roller 66 are rotated by a single motor 64, as shown in FIG. 2. This type of paper feeding mechanism is arranged such that during transmission, the forward rotation of the motor 64 is transmitted through the one-way clutch 61 to the original feeding roller 65. During reception and copying, the reverse rotation of the motor 64 is transmitted to the platen roller 66 through a coupling gear 67 and the one-way clutch 62 and also transmitted to the original feeding roller 65 through the coupling gear 67 and the one-way clutch 63.

However, in the former of the conventional paper feeding mechanisms, there are provided both the motor 52 for transmission and the motor 54 for reception as respective drive sources of the original feeding roller 51 and the platen roller 53. This is a great handicap to cost curtailment and size and weight reductions. In the latter, the provision of the three one-way clutches 61, 62, and 63 makes it possible to use a single motor 64 as the drive source. Nonetheless, the one-way clutches 61, 62 and 63 are so expensive that sufficient effects of cost reduction cannot be obtained. Another problem is that when this paper feeding mechanism is applied to a facsimile device with an auto cutter, for example, the platen roller 66 cannot be rotated in reverse direction, so that a recording paper cannot be brought from the auto cutter position back to the printing position.

SUMMARY OF THE INVENTION

It is therefore an object of the present invention to provide a paper feeding device, used for a facsimile apparatus, for feeding an original and a recording paper at the time of transmission, reception and copying with a single motor without one-way clutches.

A paper feeding device according to the present invention is provided with a drive source having a shaft rotatable in forward or reverse direction and a drive gear mounted fixedly to the shaft, a sun gear disposed rotatably around a supporting point and engaging with the drive gear, first and second planetary arms mounted rotatably to the supporting point of the sun gear, respectively, first and second planetary gears attached rotatably to the first and second planetary arms and engaging with the sun gear, respectively, and arm lock mechanism for positioning and fixing the first and second planetary arms, respectively.

The rotation of the shaft of the drive source is transmitted through either the first or second planetary gear to at least one of the original feeding roller for feeding and conveying an original and the platen roller for feeding and conveying a recording paper.

Preferably the arm lock mechanism includes a first lock pawl attached rotatably around a point and engaging with the first planetary arm, a second lock pawl attached rotatably around the point and engaging with the second planetary arm, a first spring connected to one side end of the first lock pawl at one end thereof, a second spring connected to one side end of the second pawl at one end thereof, and mechanism for turning the second pawl around the point. The first pawl is urged to turn by the first spring and the second pawl is urged to turn by the second spring, and the second pawl includes a limiter for limiting the turn of the first pawl.

The device may be also provided with a first reduction gear engaging with a gear attached fixedly to the original feeding roller and a second planetary gear in a copy mode of the facsimile apparatus, a first idler gear engaging with the first reduction gear and the first planetary gear in a transmission mode of the apparatus, a second reduction gear engaging with a gear attached fixedly to the platen roller, a second idler gear engaging with the second reduction gear and first planetary gear in a reception mode and a copy mode of the apparatus.

In the transmission mode, as the shaft of the drive source is rotated in forward direction, the sun gear is rotated in reverse direction about its supporting point. Along with this, the first planetary arm is turned in reverse direction about the supporting point of the sun gear, and the first planetary gear is rotated in forward direction, so that the forward rotation of the shaft of the drive source is transmitted to the original feeding roller.

In the reception mode, with the second planetary arm positioned and fixed in a reverse-rotating direction by the arm lock mechanism, the shaft of the drive source is rotated in reverse direction, and the sun gear is rotated in forward direction about the supporting point. Along with this, the first planetary arm is turned in forward direction about the supporting point of the sun gear, and the first planetary gear is rotated in reverse direction, so that the reverse rotation of the shaft of the drive source is transmitted to the platen roller.

In the receiving system reverse rotation mode, with the first planetary arm positioned and fixed in a forward-rotating direction by the arm lock mechanism, the shaft of the drive source is rotated in forward direction, and the sun gear is rotated in reverse direction about its supporting point. Simultaneously, the first planetary gear is rotated in forward direction, so that the forward rotation of the drive source is transmitted to the platen roller.

In the copy mode, as the shaft of the drive source is rotated in reverse direction, and the sun gear is rotated in forward direction about its supporting point. At the same time, the first planetary arm is turned in forward direction about the supporting point of the sun gear and the first planetary gear is rotated in reverse direction, so that the reverse rotation of the shaft of the drive source is transmitted to the platen roller. On the other hand, the second planetary arm is turned in forward direction about the supporting point of the sun gear and the second planetary gear is rotated in reverse direction, so that the reverse rotation of the shaft of the drive source is transmitted to the original feeding roller.

Therefore, the paper feeding device can perform operations in the transmission, reception, copy, and reverse rotation modes with a single drive source and without one-way clutches, and in result effects of cost reduction, size reduction and weight reduction of facsimile apparatus is obtained.

Further objects and advantages of the present invention will be apparent from the following description of the preferred embodiment of the invention as illustrated in the accompanying drawings.

DESCRIPTION OF THE DRAWINGS

FIG. 6 is an explanatory diagram showing the state when the solenoid as a component part of the paper feeding device is ON;

DESCRIPTION OF THE EMBODIMENTS

Referring to FIGS. 3 to 9, an embodiment of the present invention will be described in the following. FIGS. 4 to 9 are schematic construction diagrams showing a paper feeding device of a facsimile apparatus. For convenience of description, the clockwise direction in those figures is designated as the forward direction and the counter-clockwise direction as the reverse direction in the following description.

Figure 1:
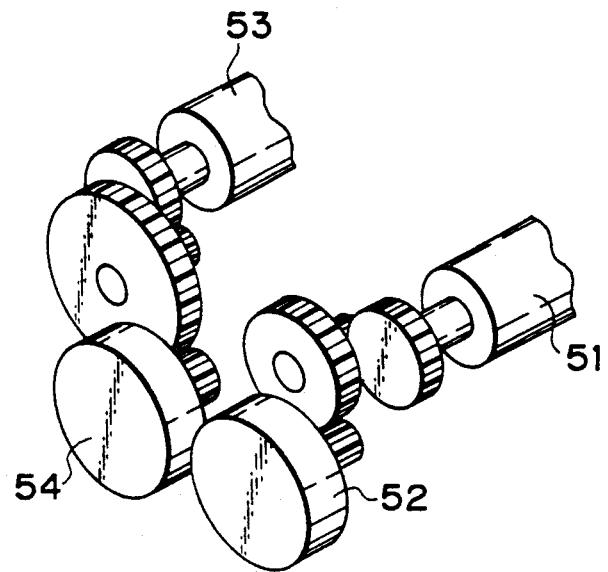
FIG. 1 is a schematic construction diagram showing a conventional paper feeding device.
Figure 2:
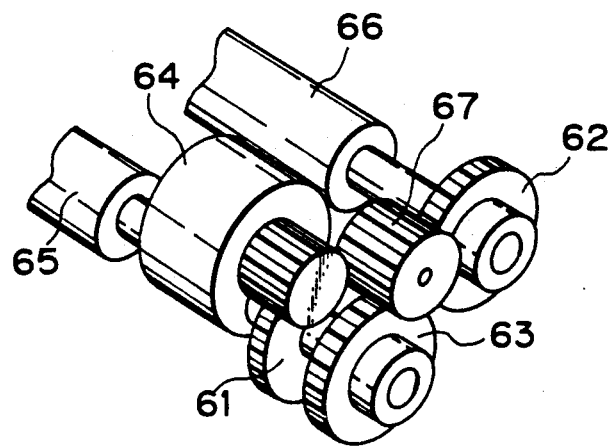
FIG. 2 is a schematic construction diagram showing another conventional paper feeding device.
Figure 3:
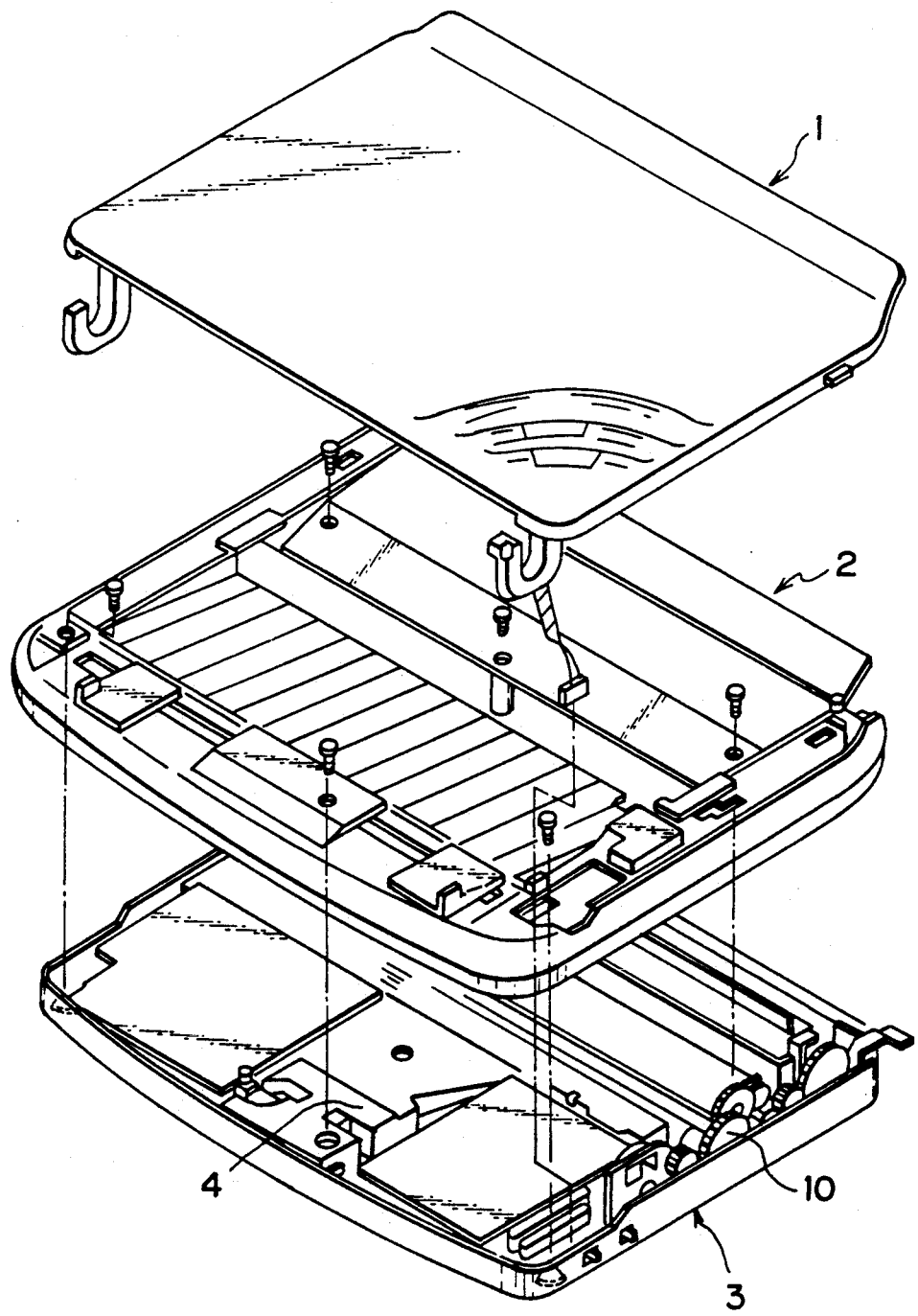
FIG. 3 is an exploded view of the facsimile apparatus involving the paper feeding device according to the present invention.

As shown in FIG. 3, for example, the facsimile apparatus is provided with a top plate 1, an upper cabinet 2 serving as an original guide just below the top plate 1, and a lower cabinet 3 where an optical system is accommodated. At a side end portion of the lower cabinet 3, there is provided the paper feeding device 10.

Figure 4:
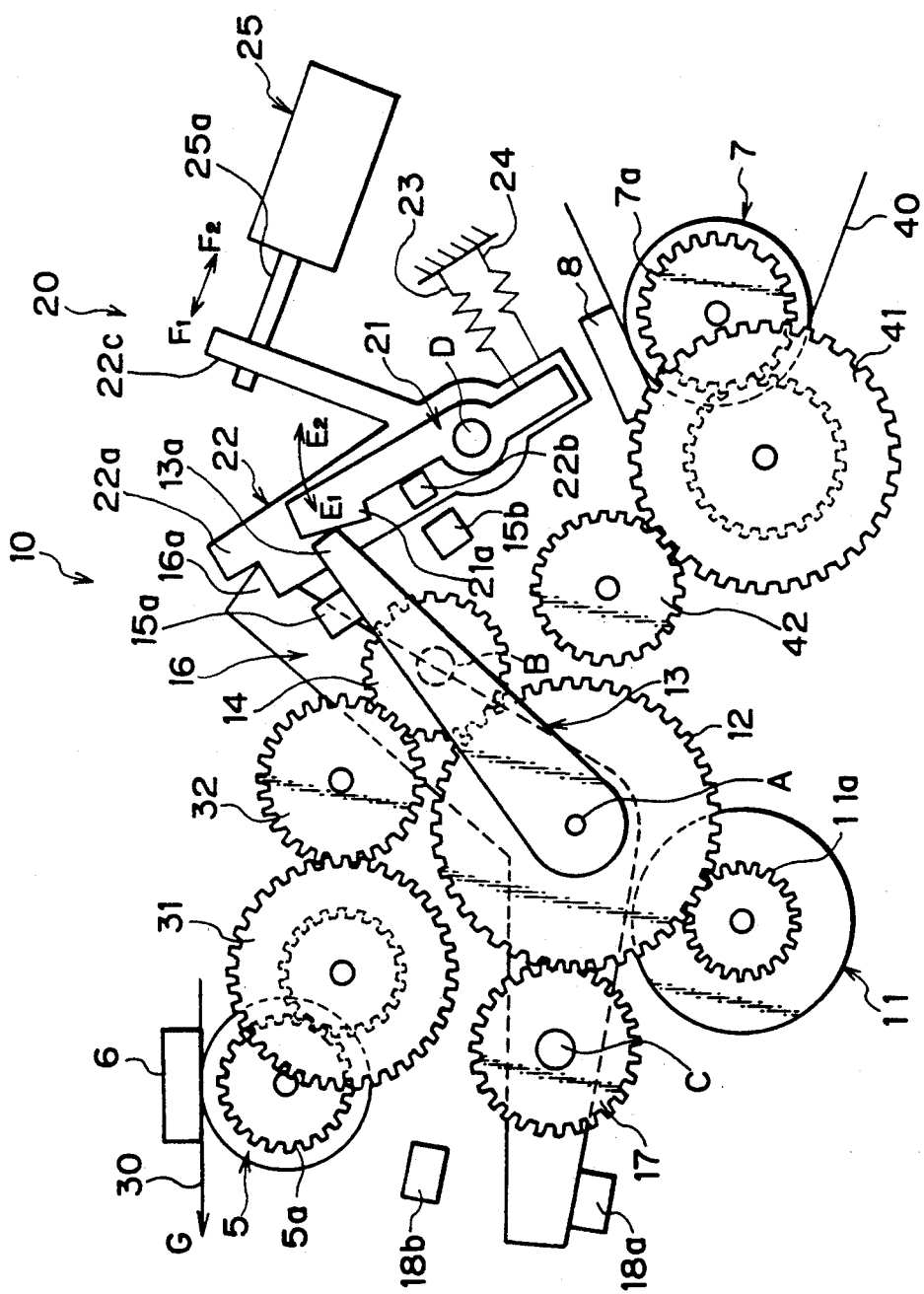
FIG. 4 is a schematic construction diagram showing an embodiment of the paper feeding device according to the present invention.

As shown in FIG. 4, in the paper feeding device 10, an original 30 is fed to between an original feeding roller 5 and a reading unit 6, and is conveyed forward by rotation of the original feeding roller 5, while a recording paper 40 is fed to between a platen roller 7 and a recording head 8, and is conveyed by rotation of the platen roller 7.

As shown in FIG. 4, the paper feeding device 10 is provided with a motor 11 as a drive source. A rotating shaft of the motor 11 is provided such that it rotates either in forward or reverse direction, and a motor gear 11a is mounted fixedly at one end of the shaft as a drive gear, which engages with a sun gear 12.

The sun gear 12 is supported rotatably in the device with a supporting point A as the center of rotation. A first planetary arm 13 is attached rotatably at one end of the supporting point A, and a bent portion of a V-shaped second planetary arm 16 is attached rotatably at the other end of the supporting point A.

The first planetary arm 13 has the other end portion formed as an engaging part 13a which engages with a first locking pawl 21. At a middle portion of the first planetary arm 13, a first planetary gear 14 engaging with the sun gear 12 is disposed rotatably with a supporting point B as the center of rotation. Near the other end of the first planetary arm 13, there are provided with a couple of first arm rotation limiting members 15a and 15b, whereby the rotation of the first planetary arm 13 is limited.

The second planetary arm 16 has one end portion formed as an engaging part 16a which engages with a second lock pawl 22. At about the middle portion of the other end side of the second planetary arm 16, a second planetary gear 17 engaging with the sun gear 12 is attached rotatably with a supporting point C as the center of rotation. Near the other end side of the second planetary arm 16, there are provided a couple of second arm rotation limiting members 18a and 18b, whereby the rotation of the second planetary arm 16 is limited.

Between the first planetary arm 13 and the first planetary gear 14 and between the second planetary arm 16 and the second planetary gear 17, there are provided friction members (not shown in FIG. 4). The planetary arms 13 and 16 are turned about the supporting point A by the rotation of the planetary gears 14 and 17 caused by the rotation of the sun gear 12, and the torque of the rotation about the supporting point A is limited by the friction members mentioned above.

At the side of the engaging part 13a of the first planetary arm 13 and the engaging part 16a of the second planetary arm 16, there is provided an arm lock unit 20 including the first and second lock pawls 21 and 22, first and second springs 23 and 24, and a solenoid 25.

The first lock pawl 21 is supported in the device so as to be rotatable about a supporting point D. The other end of a first spring 23 fixed at one end thereof in the device is connected to one end of the first lock pawl 21, so that the first lock pawl 21 is urged to turn toward $E_1$ about the supporting point D. The first lock pawl 21 includes at the other end thereof an engaging pawl part 21a which engages with the engaging part 13a of the first planetary arm 13.

Like the first lock pawl 21, the second lock pawl 22 is supported in the device so as to be rotatable about the supporting point D. The other end of the second spring 24 fixed at one end thereof in the device is connected to one end of the second lock pawl 22, so that the second lock pawl 22 is urged to turn toward $E_1$ about the supporting point D. The second lock pawl 22 includes at the other end thereof an engaging part 22a which engages with the engaging part 16 of the second planetary arm in the similar manner as described above.

For the second lock pawl 22, there is provided a rotation limiting member 22b for limiting the rotation of the second lock pawl 22 toward $E_1$ of the first lock pawl 21. The second lock pawl 22 is also provided with a connecting part 22c for connecting with the solenoid 25.

The solenoid 25 has a movable shaft 25a which moves in the direction of $F_1$ and $F_2$. The end portion of the movable shaft 25a is coupled to the connecting part 22c of the second lock pawl 22. So, when the movable shaft 25a advances toward $F_1$, the second lock pawl 22 is turned in the direction of $E_1$, and when the movable shaft 25a retracts toward $F_2$, the second lock pawl 22 is turned in the direction of $E_2$. As for the advance-retract motion of the movable shaft 25a, when a current is supplied to the solenoid 25, the movable shaft 25a retracts toward $F_2$. Therefore, when the current supplied to the solenoid 25 is stopped, the movable shaft 25a is made to advance toward $F_1$ by an elastic force of the second spring 24 through the intermediary of the second lock pawl 22. For convenience of description, a state in which the movable shaft 25a has been moved toward $F_1$ and is forced toward $F_1$ by the spring 24 is designated as OFF state of the solenoid 25, and a state in which the movable shaft 25a has been moved toward $F_2$ is designated as ON state of the solenoid 25.

Supported rotatably in the device between the first planetary gear 14 and the original feeding roller 5 are a reduction gear 31 engaging with a feeding gear 5a mounted fixedly to the original feeding roller 5, and an idler gear 32 engaging with the reduction gear 31. As the rotating shaft of the motor 11 rotates in forward direction, the first planetary arm 13 is turned in reverse direction about the supporting point A, and the first planetary gear 14 is rotated in forward direction about the supporting point B, so that through the intermediary of the idler gear 32 which now engages with the first planetary gear 14, the forward rotation of the rotating shaft of the motor 11 is transmitted to the original feeding roller 5.

Rotatably supported in the device between the first planetary gear 14 and the platen roller 7 are a reduction planetary gear 41 engaging with a platen gear 7a mounted fixedly to the platen roller 7, and an idler gear 42 engaging with the reduction gear 41. As the rotating shaft of the motor 11 rotates in reverse direction, the first planetary gear 14 is rotated in reverse direction about the supporting point B, so that through the intermediary of an idler gear 42 which now engages with the first planetary gear 14, the reverse rotation of the rotating shaft of the motor 11 is transmitted to the platen roller 7.

By reverse rotation of the motor 11, the second planetary arm 16 is rotated in forward direction about the supporting point A, and the second planetary gear 17 is rotated in reverse direction about the supporting point C, so that through the intermediary of the second planetary gear 17 which engages with the second planetary gear 17, the reverse rotation of the rotating shaft of the motor 11 is transmitted to the original feeding roller 5.

Under the above-described arrangement, the operation processes of the paper feeding device in the facsimile apparatus in the transmission mode, copy mode, reception mode, and reverse rotation mode will be described in the following.

The transmission mode is a mode in which an original 30 is read by the reading unit 6, and the original feeding roller 5 is rotated to convey the original 30. The reception mode is a mode in which a received image information through the public telephone network or the like is printed on a recording paper by the recording head 8, and the platen roller 7 is rotated in forward direction to feed the recording paper 40. The copy mode is a mode in which the operations both in the transmission mode and the reception mode are performed simultaneously. Thus, image data read by the reading unit 6 is recorded on the recording paper in the same device.

The reverse rotation mode is a mode in which the platen roller 7 is rotated in reverse direction to convey a recording paper 40 in order to bring the recording paper 40 form the auto cutter position (not shown in figures) back to the printing position.

Figure 5:
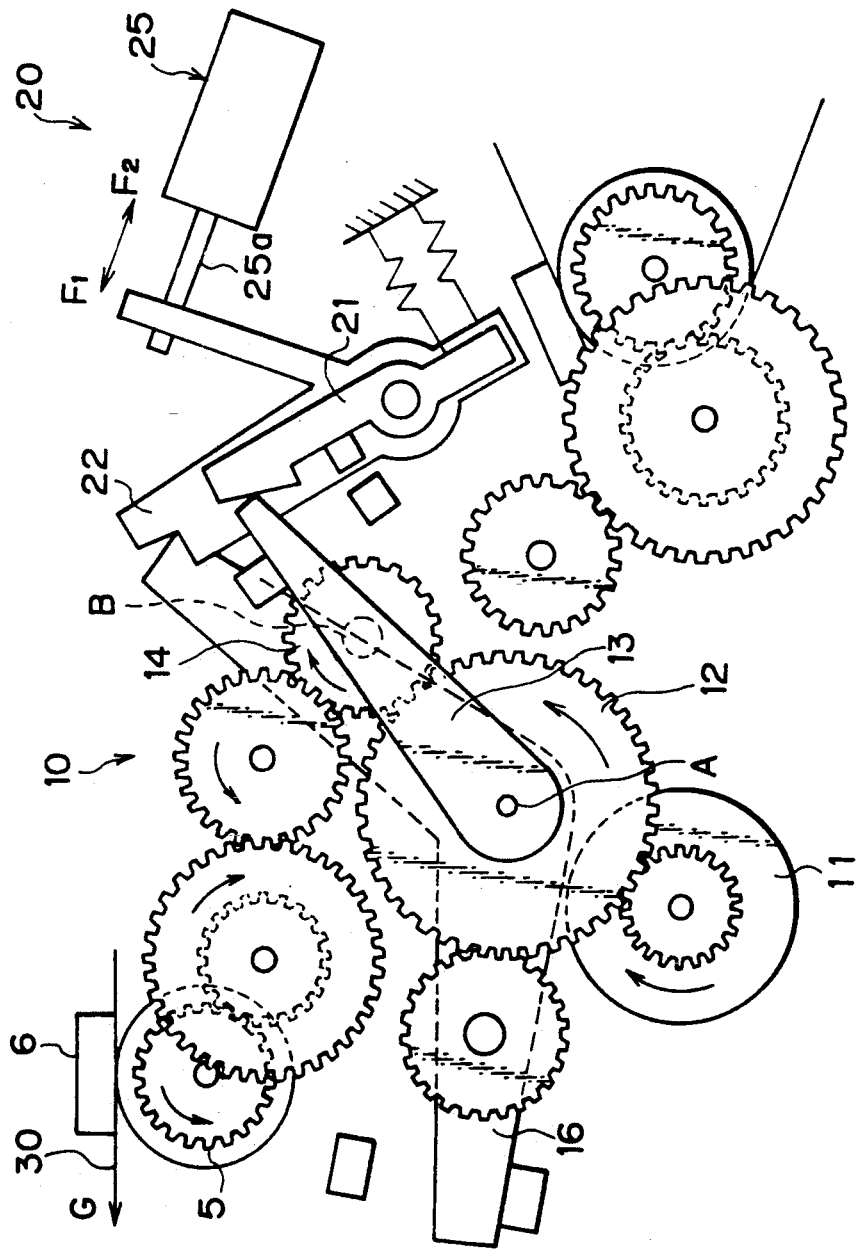
FIG. 5 is an explanatory diagram showing the state in the transmission mode of the paper feeding device.
Figure 6:
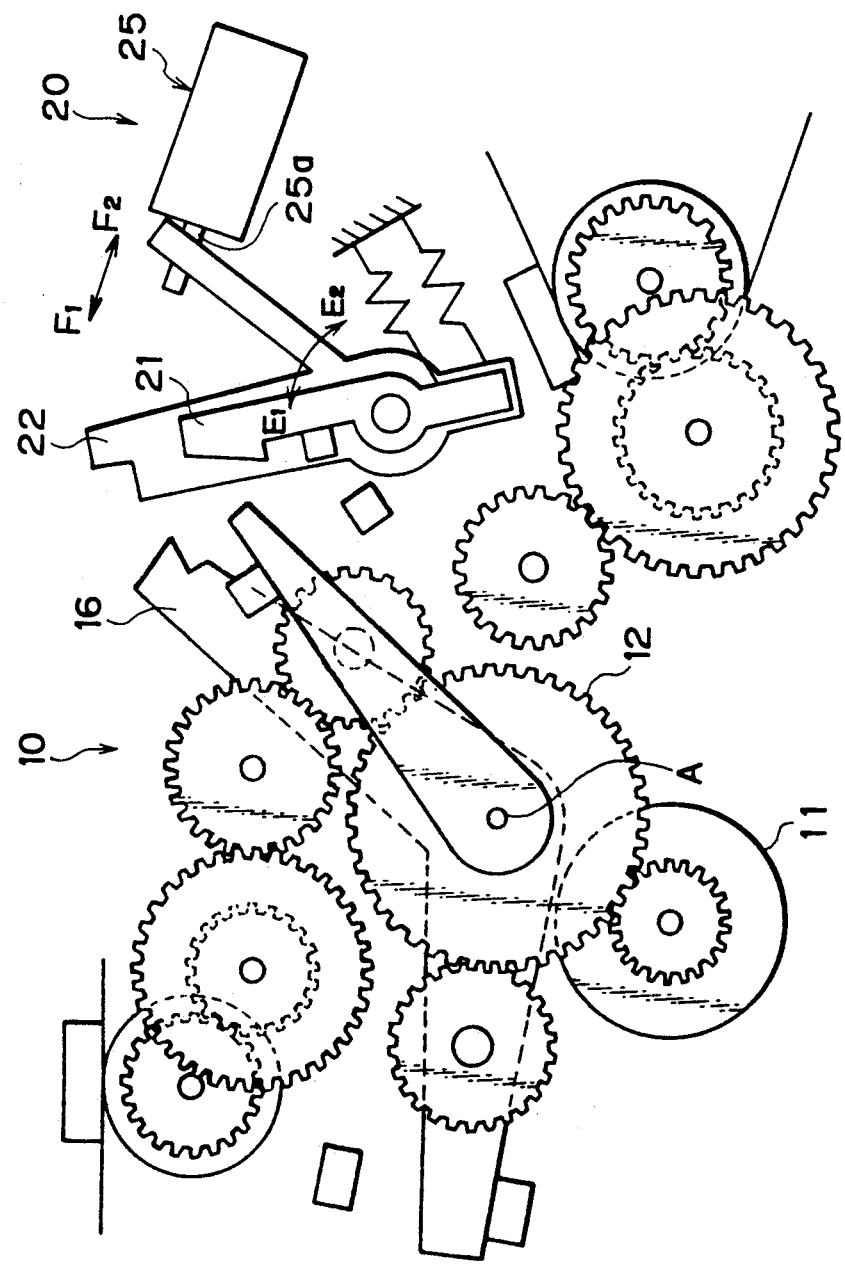

In the transmission mode, as shown in FIG. 5, by rotating the rotating shaft of the motor 11 in forward direction, the sun gear 12 is rotated in reverse direction about the supporting point A. Along with this, the first planetary arm 13 is rotated in reverse direction about the supporting point A, and the first planetary gear 14 is rotated in forward direction about the supporting point B, so that the forward rotation of the motor 11 is transmitted to the original feeding roller 5. By this rotation of the original feeding roller 5, the original 30 put between the original feeding roller 5 and the reading unit 6 is conveyed in the direction of G. In the transmission mode mentioned above, the solenoid 25 is in the OFF state, the second planetary arm 16 engages with the second arm rotation limiting member 18a, and is positioned and fixed in the reverse-rotating direction, while the first planetary arm 13 is in held in released relation with the first lock pawl 21.

Figure 7:
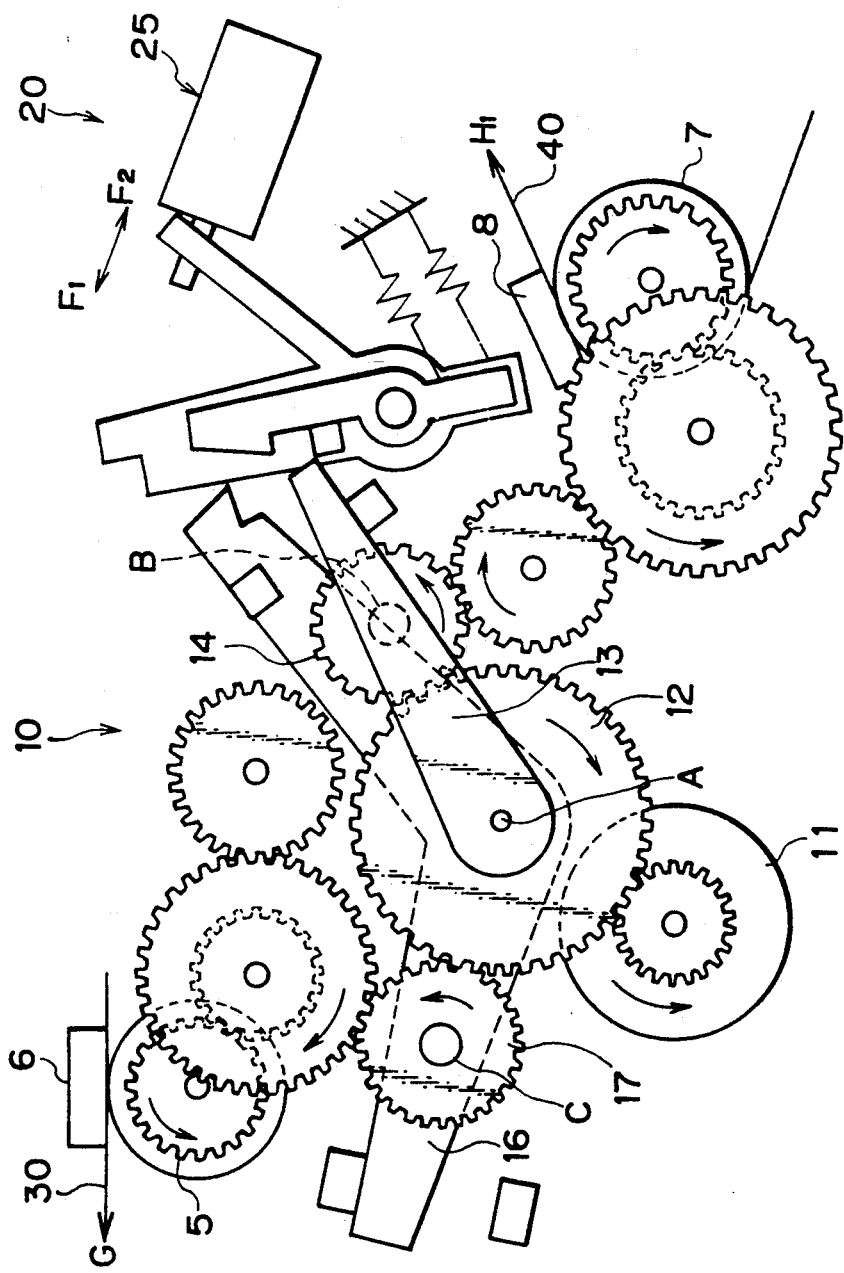
FIG. 7 is an explanatory diagram showing the state in the copy mode in the paper feeding device.

In the copy mode, from the operating condition of the paper feeding device 10 in the transmission mode mentioned above, the solenoid 25 is energized and in the ON state, and the movable shaft 25a of the solenoid 25 retracts in the direction of $F_2$ as shown in FIG. 7. Therefore, the first lock pawl 21 and the second lock pawl 22 are turned in the direction of $E_2$, so that the second planetary arm 16 and the second lock pawl 22 are disengaged. Under this condition, the rotating shaft of the motor 11 is rotated in reverse direction to cause the sun gear 12 to rotate in forward direction about the supporting point A. Simultaneously, the first planetary arm 13 is rotated in forward direction about the supporting point A, and the first planetary gear 14 is rotated in reverse direction about the supporting point B, so that the reverse rotation of the rotating shaft of the motor 11 is transmitted to the platen roller. At the same time, the second planetary arm 16 is rotated in forward direction about the supporting point A, and the second planetary gear 17 is rotated in reverse direction about the supporting point B, so that the reverse rotation of the rotating shaft of the motor 11 is transmitted to the original feeding roller 5. By the above-mentioned rotation of the platen roller 7, a recording paper 40 put between the platen roller 7 and the recording head 8 is transferred in the direction of $H_1$, and by the rotation of the original feeding roller 5, the original 30 put between the original feeding roller 5 and the reading unit 6 is conveyed in the direction of G.

Figure 8:
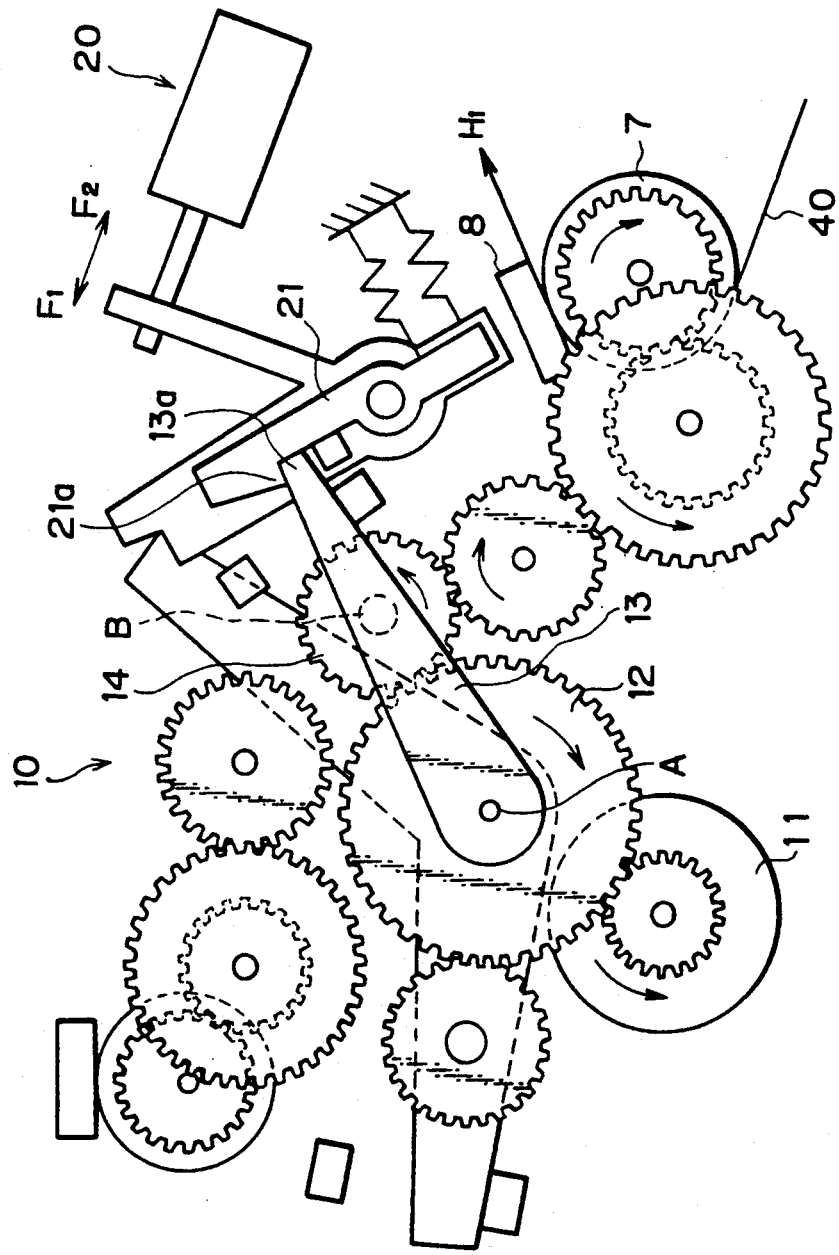
FIG. 8 is an explanatory diagram showing the state in the reception mode in the paper feeding device.

In the reception mode, from the operating condition of the paper feeding device 10 in the transmission mode described above, the rotating shaft of the motor 11 is rotated in reverse direction, and the sun gear 12 is rotated in forward direction about the supporting point A as shown in FIG. 8. Along with this, the first planetary arm 13 is rotated in forward direction about the supporting point A, and the first planetary gear 14 is rotated in reverse direction about the supporting point B, so that the reverse rotation of the rotating shaft of the motor 11 is transmitted to the platen roller 7. By the rotation of the platen roller 7 mentioned above, a recording paper 40 put between the platen roller 7 and the recording head 8 is fed in the direction of $H_1$. In the reception mode mentioned above, the second planetary arm 16, by its forward rotation attending the forward rotation of the sun gear 12, has its engaging part 16a engaged by an engaging pawl 22a of the second lock pawl 22, and is positioned and fixed in the forward-rotating direction.

Figure 9:
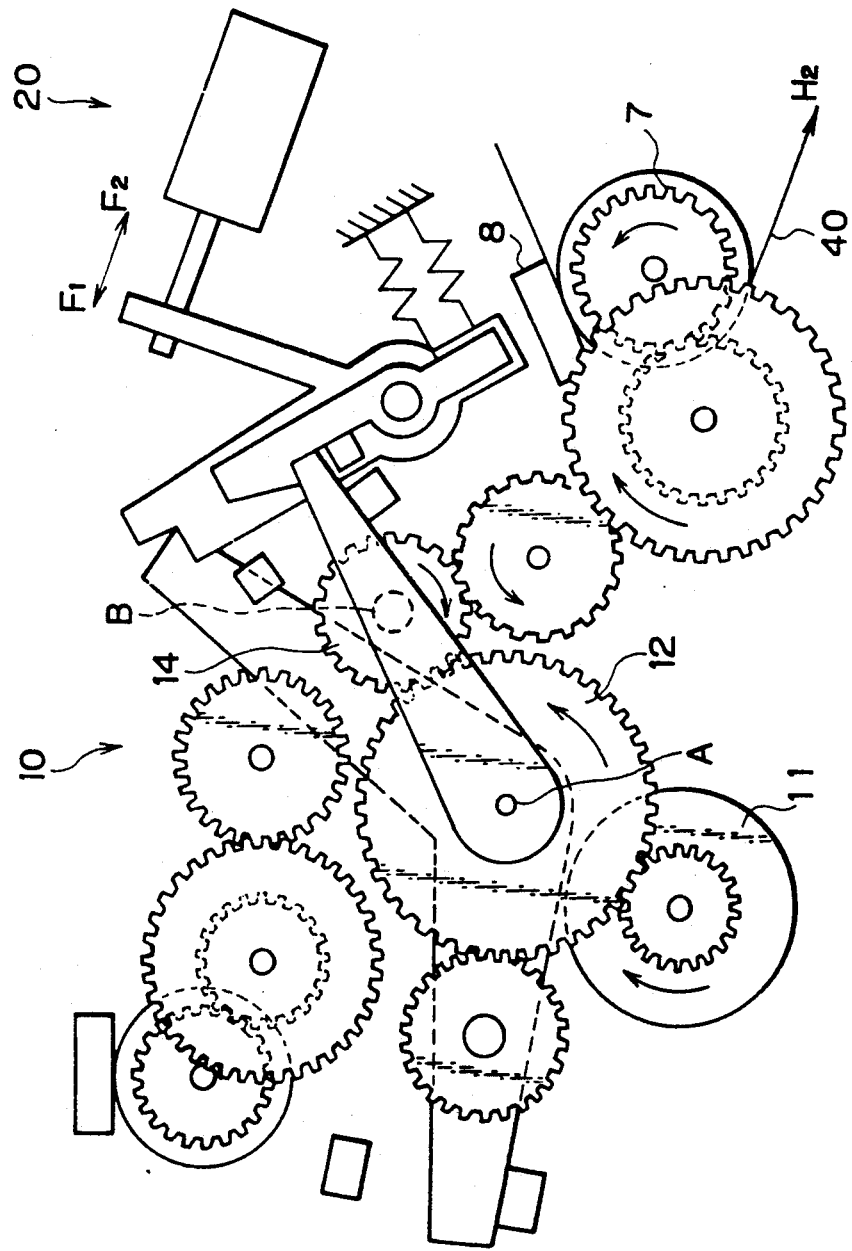
FIG. 9 is an explanatory diagram showing the state in the receiving system reverse rotation mode in the paper feeding device.

In the reverse rotation mode, from the operating condition of the paper feeding device 10 in the reception mode mentioned above, the rotating shaft of the motor 11 is rotated in forward direction, and the sun gear 12 is rotated in reverse direction about the supporting point A as shown in FIG. 9. In conjunction with this, the first planetary gear 14 is rotated in forward direction about the supporting point B, and the forward rotation of the motor 11 is transmitted to the platen roller 7. The recording paper 40 put between the platen roller 7 and the recording head 8 is conveyed in the direction of $H_2$.

As described above, the paper feeding device 10 according to this embodiment is arranged such that in any of the transmission mode, copy mode, reception mode, and reverse rotation mode, either or both of the original feeding roller 5 and the platen roller 7 are rotated by the motor 11 which is rotated in forward or reverse direction, and in conjunction with the motor rotation, the solenoid is turned on and off.

In any mode, for the paper feeding device 10, the initial condition is the operating condition in the transmission mode. In the reverse rotation mode, the paper feeding device 10 first assumes the operating condition in the reception mode, and then proceeds to the operation in the reverse rotation mode. This operating procedure of the paper feeding device 10 poses no problem to the operation of the facsimile apparatus.

By way of a supplementary explanation, Tables 1 to 4 show the operation processes from any of the transmission, reception, copy and reverse rotation modes with the paper feeding device according to this embodiment in relation to the ON and OFF states of the solenoid 25.

The present invention obviates the need to provide expensive one-way clutches, enables operations in the transmission, reception, copy and reverse rotation modes by a single drive source, and offers effects of cost reduction, size reduction and weight reduction of facsimile devices.

Many widely different embodiments of the present invention may be constructed without departing from the spirit and scope of the present invention. It should be understood that the present invention is not limited to the specific embodiments described in the specification, except as defined in the appended claims.

TABLE 1

| | | Motor rotating direction | |
| --- | --- | --- | --- |
| | | Forward | Reverse |
| Solenoid | ON | (Transmission mode) | To copy mode |
| | OFF | Transmission mode | To reception mode |

From the initial state (transmission mode)

TABLE 2

| | | Motor rotating direction | |
| --- | --- | --- | --- |
| | | Forward | Reverse |
| Solenoid | ON | To transmission mode | To copy mode |
| | OFF | To reverse rotation mode | To reception mode |

From the reception mode

TABLE 3

| | | Motor rotating direction | |
| --- | --- | --- | --- |
| | | Forward | Reverse |
| Solenoid | ON | To transmission mode | (Copy mode) |
| | OFF | To reverse rotation mode | Copy mode |

From copy mode

TABLE 4

| | | Motor rotating direction | |
| --- | --- | --- | --- |
| | | Forward | Reverse |
| Solenoid | ON | To transmission mode | To copy mode |
| | OFF | To reverse rotation mode | To reception mode |

From the reverse rotation mode

What is claimed is:

1. A paper feeding device, used for a facsimile apparatus, for feeding an original by rotating an original feeding roller and for feeding a recording paper by rotating a platen roller, said paper feeding device comprises:
   a drive source having a shaft rotatable in forward or reverse direction and a drive gear mounted fixedly to the shaft;
   a sun gear disposed rotatably around a supporting point and engaging with said drive gear;
   first and second planetary arms mounted rotatably to the supporting point of said sun gear, respectively;
   first and second planetary gears attached rotatably to said first and second planetary arms and engaging with said sun gear respectively; and
   arm lock means for positioning and fixing said first and second planetary arms, respectively,
   said drive gear, said sun gear, and at least one of said first and second planetary gears being adapted such that a rotation of said shaft of said drive source is transmitted to at least one of said original feeding roller and said platen roller when feeding at least one of an original and a recording paper.

2. A paper feeding device according to claim 1, wherein said arm lock means includes a first lock pawl attached rotatably around another supporting point and engaging with said first planetary arm, a second lock pawl attached rotatably around the other supporting point and engaging with said second planetary arm, a first spring connected to one side end of said first lock pawl at one end thereof, a second spring connected to one side end of said second pawl at one end thereof, and means for turning said second pawl around the other supporting point, said first pawl being urged to turn by said first spring and said second pawl being urged to turn by said second spring, said second pawl having a limiter for limiting the turn of said first pawl.

3. A paper feeding device according to claim 2, wherein said turning means includes a solenoid and a movable shaft drived by said solenoid and connected to said second pawl.

4. A paper feeding device according to claim 2, wherein said device further comprises a first reduction gear engaging with a gear attached fixedly to said original feeding roller and said second planetary gear in a copy mode of the facsimile apparatus, a first idler gear engaging with said first reduction gear and said first planetary gear in a transmission mode of the facsimile apparatus, a second reduction gear engaging with a gear attached fixedly to said platen roller, a second idler gear engaging with said second reduction gear and said first planetary gear in a reception mode and a copy mode of the facsimile apparatus.

5. A paper feeding device according to claim 4, wherein in the transmission mode, the rotation of said drive source is transmitted to said paper feeding roller via said sun gear, said first planetary gear, said first idler gear and said first reduction gear, in the reception mode or a reverse rotation mode, the rotation of said drive source is transmitted to said platen roller via said sun gear, said first planetary gear, said second idler gear and said second reduction gear, in the copy mode, the rotation of the drive source is transmitted to said paper feeding roller via said sun gear, said second planetary gear and said first reduction gear, and to said platen roller via said sun gear, said first planetary gear, said first idler gear and said first reduction gear.

* * * * *